March 29, 1938.  C. B. YODER  2,112,429
SINGLE OR TANDEM COMPOUND CYLINDER AND AUTOMATIC
VALVE MEANS TO CONTROL THE SAME
Original Filed June 24, 1931  5 Sheets-Sheet 1
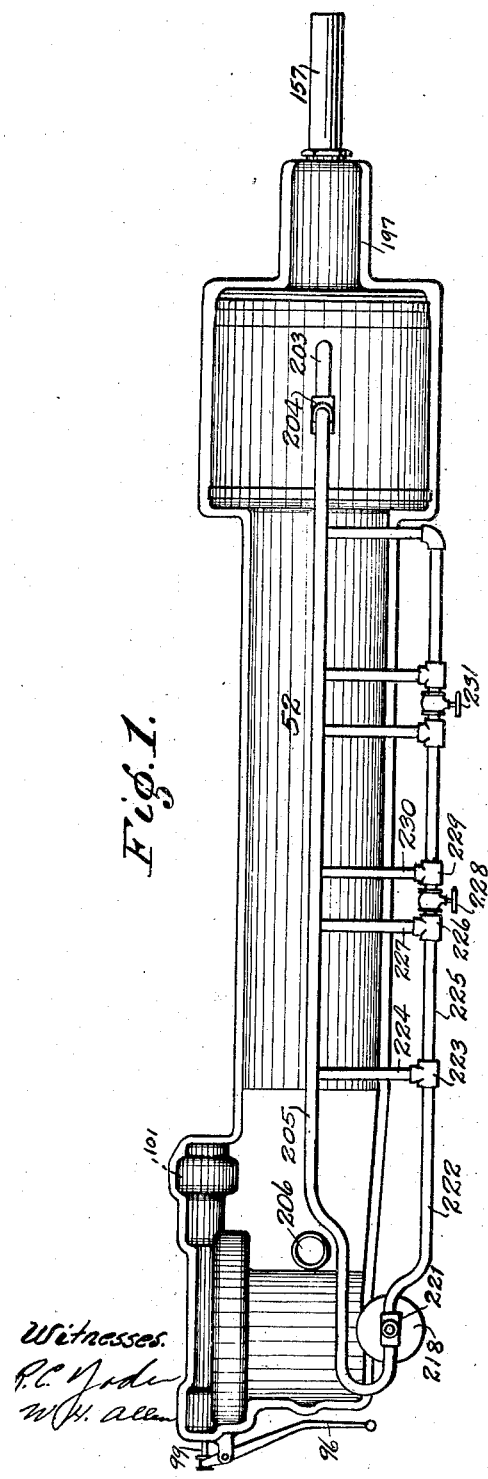
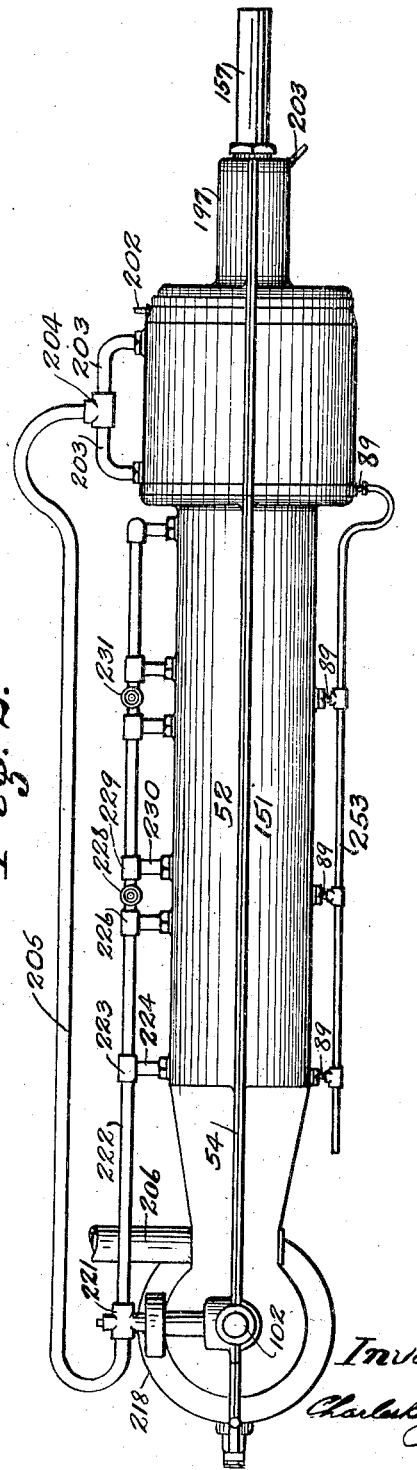
Fig. 1.
Fig. 2.
Witnesses.
Inventor

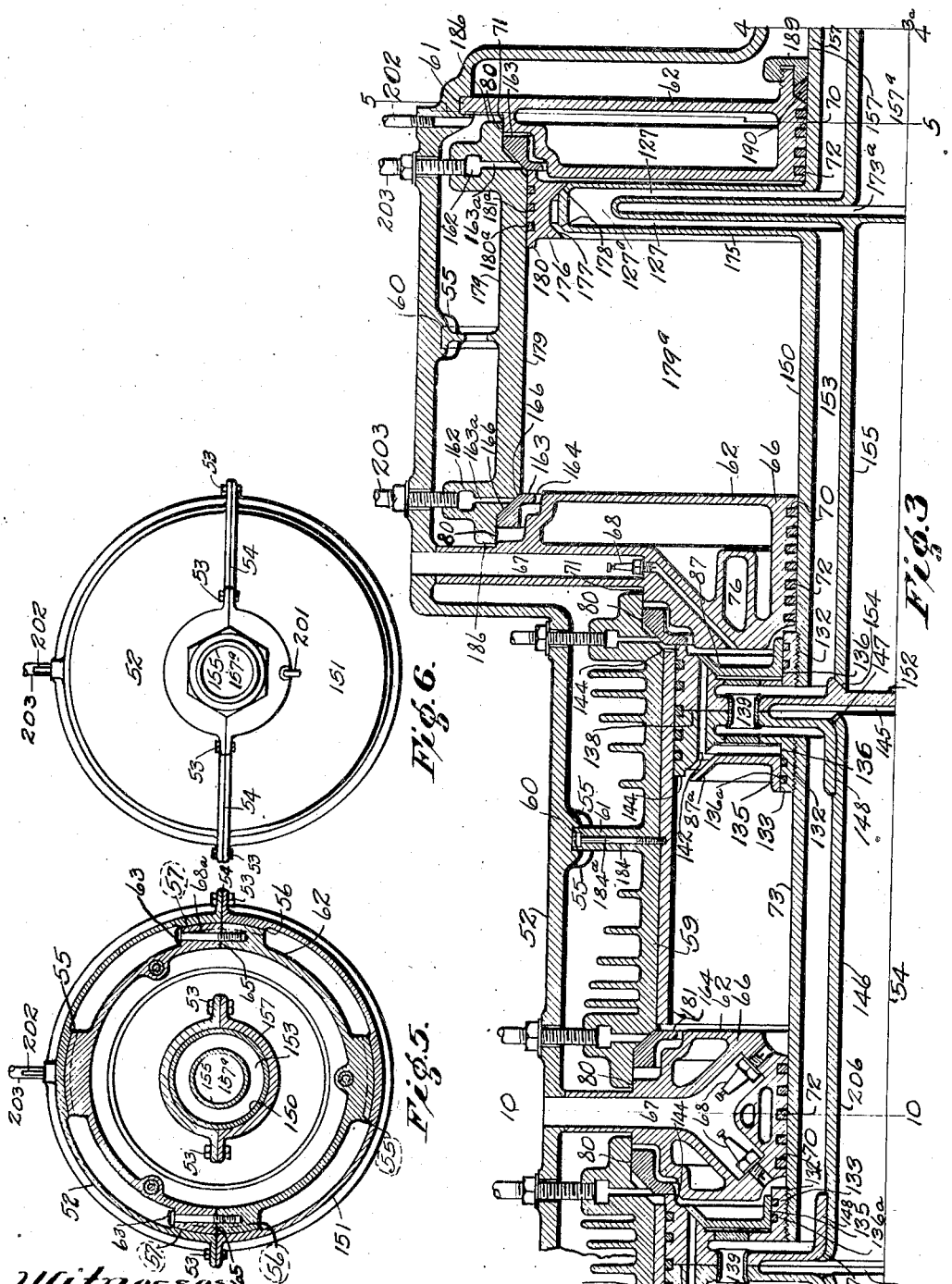

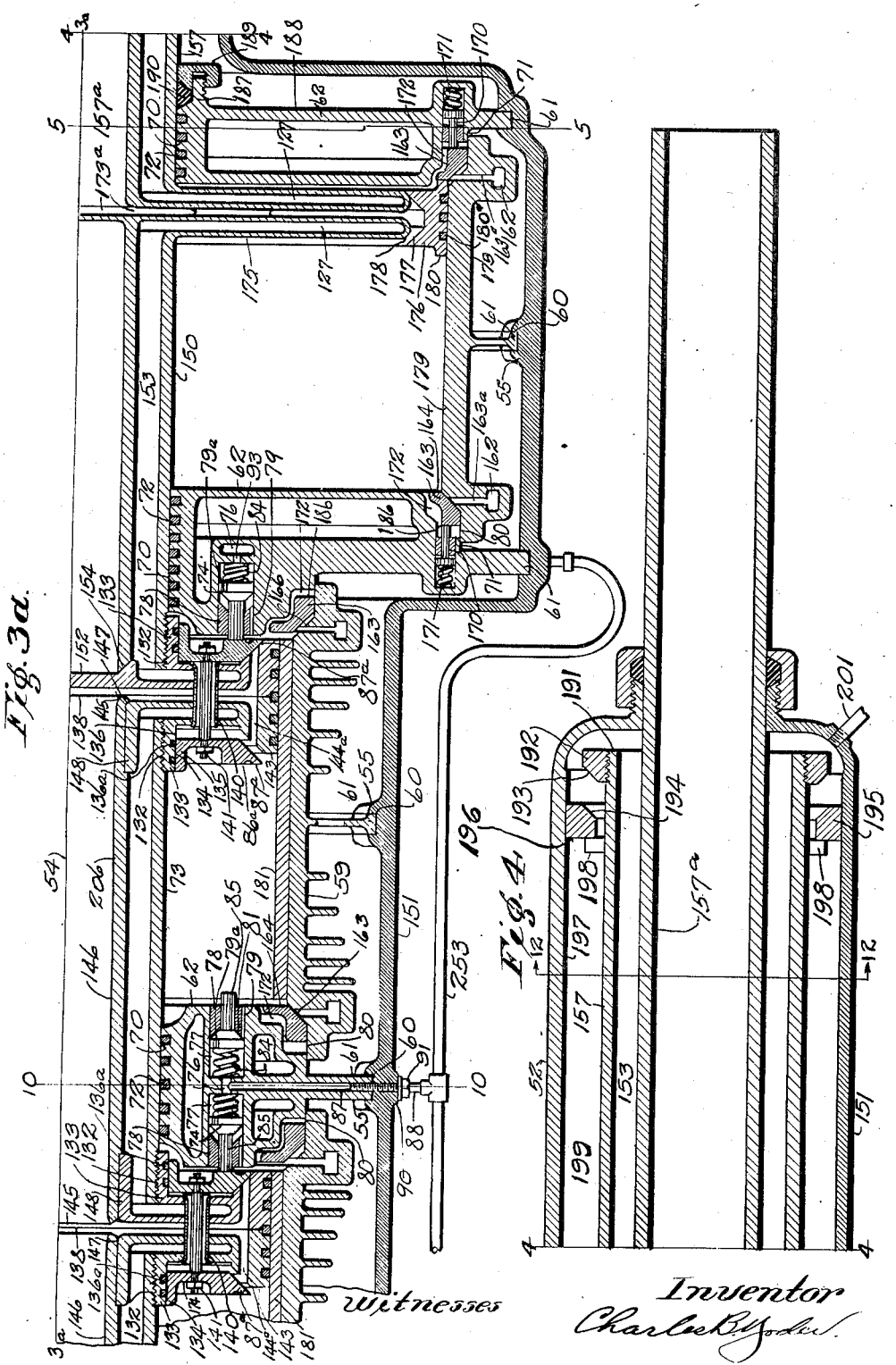

March 29, 1938.  C. B. YODER  2,112,429
SINGLE OR TANDEM COMPOUND CYLINDER AND AUTOMATIC
VALVE MEANS TO CONTROL THE SAME
Original Filed June 24, 1931   5 Sheets-Sheet 4
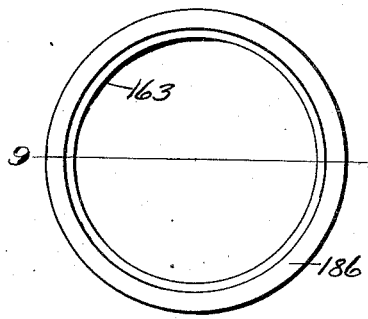
Fig. 7.
Fig. 9.
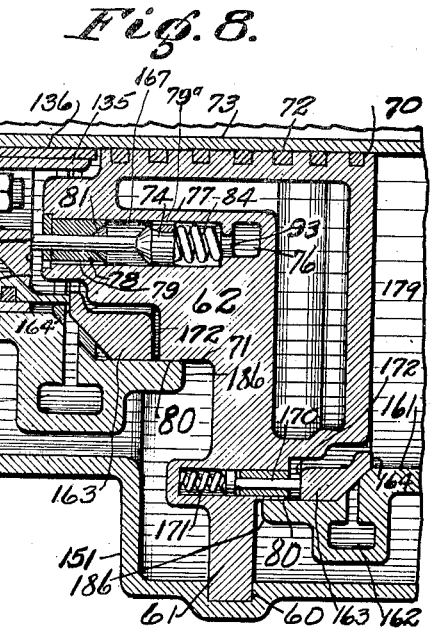
Fig. 8.
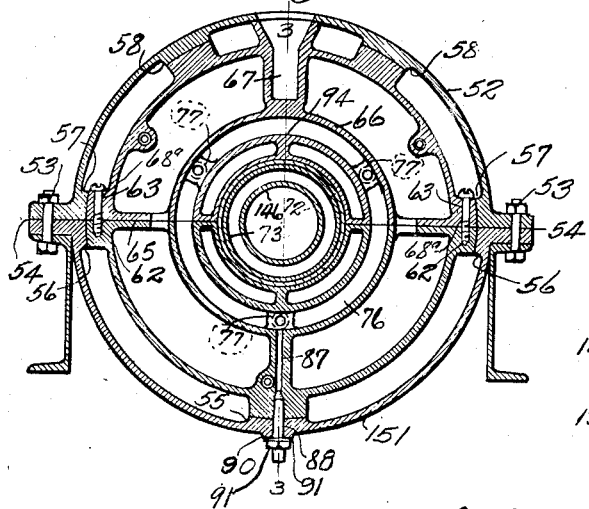
Fig. 10.
Fig. 11.
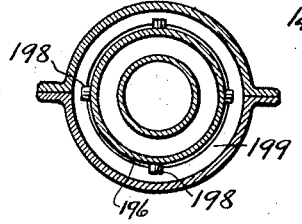
Fig. 12.
Witnesses
R. C. Yoder
W. H. Allen
Inventor
Charles B. Yoder

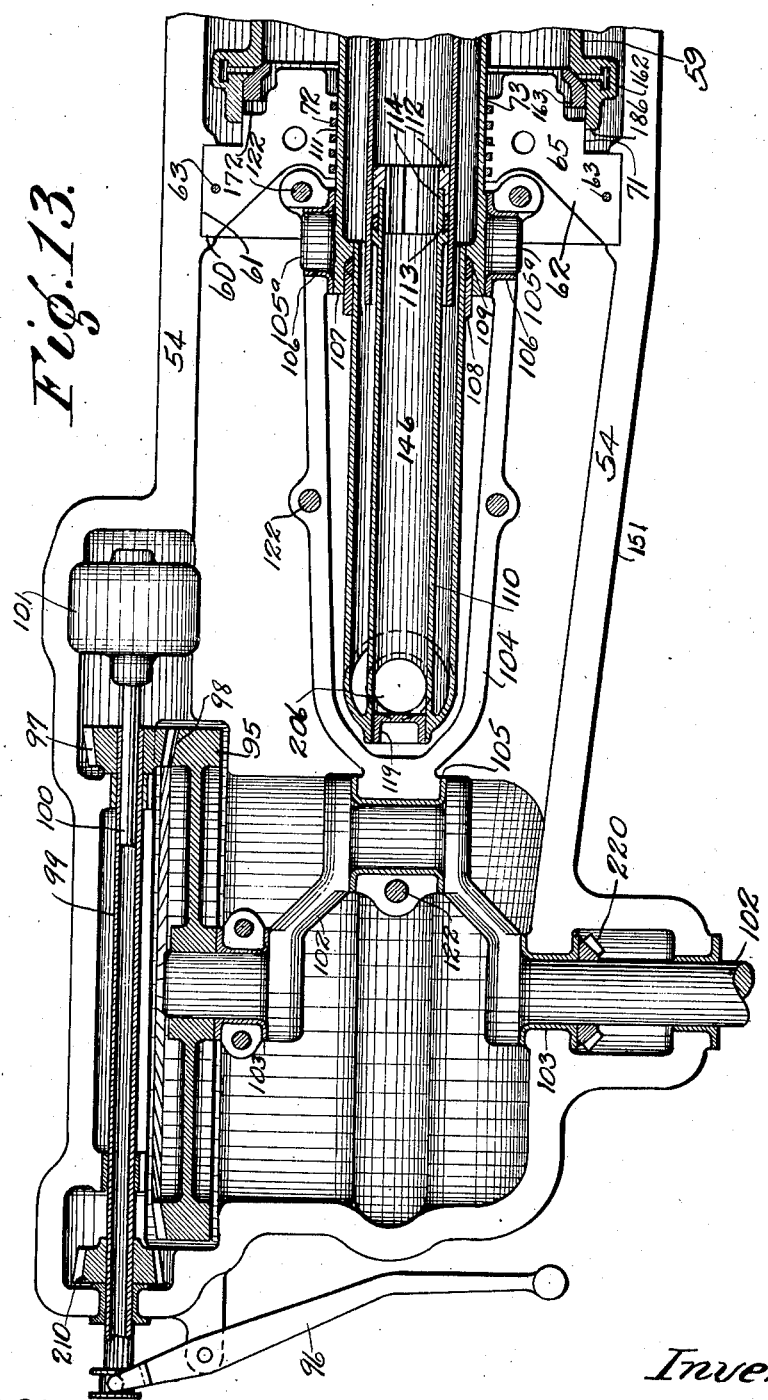

Patented Mar. 29, 1938

2,112,429

UNITED STATES PATENT OFFICE 2,112,429

SINGLE OR TANDEM COMPOUND CYLINDER AND AUTOMATIC VALVE MEANS TO CONTROL THE SAME

Charles B. Yoder, Burbank, Calif.

Application June 24, 1931, Serial No. 546,457
Renewed February 7, 1938

15 Claims. (Cl. 123—57)

A common fault of both two and four cycle engines has been that the charge is sucked or forced into the combustion cylinder at atmospheric pressure where this charge is compressed. In some cases this charge is air that is compressed to an extremely high pressure being highly heated thereby, and then fuel is forced in before the compression is completed so as to preheat the cold fuel for combustion which is supposed to occur just after passing dead center.

As is well known, the flash point of this fuel varies so that often premature explosions occur, causing failure of the crank shafts. My invention overcomes this failing because the air is compressed in one compartment and then forced into the combustion chamber, at which time the fuel is admitted to the said combustion chamber; and as this fuel has been highly heated in the cooling of the engine and compressor, I provide a fixed firing point regardless of the flash point of the said fuel. Crude oil from the well is the preferred fuel, and in this case the fuel is used as the cooling fluid. Cooling of the engine and compressor cooling compartments includes the cooling of the cylinders, exhaust tubes, piston heads, intake and exhaust valves, and the cylinder heads.

The crude oil is then piped from the engine for heating or cooling, and then to the fuel tank and from this tank is piped back to the engine cylinders for use as fuel; thus providing more overall mechanical efficiency.

When other fuels are used, such as gas, or gasoline, the cooling fluid can be water.

Heretofore; difficulty has been experienced in ridding internal combustion engine cylinders of the inert burned gas; in the present four cycle engine, one complete revolution is used solely for scavenging; the present two cycle engines, usually scavenge by over-running the outlet ports; meaning slow speed. I provide a simple means for scavenging tandem, compound, internal combustion, two cycle engine cylinders of the inert burnt gas, in a new and novel manner.

My automatic valve arrangement, consists in the novel construction, arrangement, and combination of parts, hereinafter fully, clearly, and concisely set forth in my specification, pointed out in my claims, and illustrated by the accompanying drawings, in which—

Fig. 1 is a plan view of my tandem, two cycle, compound, internal combustion engine, and compound compressor.

Fig. 2 is a side elevation of my tandem, two cycle, compound, internal combustion engine, and compound compressor.

Fig. 3 is a half longitudinal section taken from center line 3a—3a and taken from line 3—3, of Fig. 10 showing the upper half of a section at Fig. 10 showing the upper half of a section at center of a portion, and one complete combustion cylinder, and a complete compression cylinder to line 4—4.

Fig. 3a is a half longitudinal section taken from center line 3a—3a, and taken from line 3—3 of Fig. 10 showing the lower half of a section at center of a portion, and one complete combustion cylinder, and a complete compressor cylinder to line 4—4, thus, Figs. 3 and 3a form a complete half section taken on line 3—3 of Fig. 10.

Fig. 4 is a continuation of Figs. 3 and 3a, to the air intake end of my invention from line 4—4.

Fig. 5 is a reduced cross sectional view, taken on line 5—5 of Fig. 3.

Fig. 6 is an end view of the air intake end.

Fig. 7 is an end elevation of my combustion cylinder intake valves, and my compressor cylinder outlet valves, these valves both being shaped the same, only varying in diameter.

Fig. 8 is a partial sectional view, broken away on three sides, to show the air intake valve to the combustion chamber open; the compressed air outlet valve closed; and the cylinder heads retained, by the retainer lugs, fitting into the retainer annular grooves in the outer casing.

Fig. 9 is a cross sectional view of my intake, and outlet valves, taken on line 9—9 of Fig. 7.

Fig. 10 is a cross sectional view of my invention, taken on line 10—10 of Figs. 3 and 3a.

Fig. 11 is an enlarged cross section of my engine piston, showing both exhaust valves half open; to more clearly illustrate their operation.

Fig. 12 is a cross sectional view, taken on line 12—12 of Fig. 4.

Fig. 13 is a partial longitudinal plan sectional view at center of the crank shaft end of my invention; showing the split forked connecting rod, single throw crank shaft, for multiple cylinder engines, flywheel, reversing mechanism, and starter-generator.

Referring to the drawings by numerals, 151, designates lower casing as a whole, secured to upper casing 52, by bolts 53, shown only on Figs. 5, 6, and 10. The upper and lower casings have a ground joint 54, as the center of my invention; thus avoiding the use of gaskets. Machining, and grinding these center surfaces, is the first machining operation on these casings.

This novel construction permits all working parts to be lifted from the lower casing, which rests in the foundation, when the upper casing has been removed; a very important feature in assembling, disassembling, and for ready inspection of my engine and compressor.

On the inside of lower casing 151, are cast lugs 55, and half lugs 56, registering with lugs 57, and 58, of upper casing 52 between all engine cylinders 59, and compression cylinders 179. All of said lugs have grooves 60 closely fitting tongues 61 to hold cylinder heads 62, and cylinders 59, and 179, in proper position.

Cylinder heads 62 are composed of two castings held together by screws 63, Figure 10. Both castings semi-cylindrical in shape, are divided by a ground joint 65. Upper casting 66 has spark, or glow plug openings 67 for said plugs 68, so that these plugs can be removed without disturbing the rest of the engine. Cylinder heads 62 are machined as follows; the rough castings are machined and ground on the center line 65. The machine bolt holes 68a are drilled and the lower half 62 of the hole is tapped, and the two halves are fastened together by machine screws 63, so that the center opening and the outside surfaces can be machined and ground.

Center opening has ring grooves 70 machined for piston rings 72. Lugs 55, 56, 57, and 58 are turned off; and cylindrical surface faced and ground to fit into ground surface 80 of cylinders 59, and 179.

My cylinder heads being fitted together by a ground joint 65 fitting closely into ground surface 80 of cylinders 59 and 179, provide a novel construction, in that piston rings 72, that act by gripping the inner surface, instead of the outer surface; and the said heads being split on a ground joint permit the said rings to be put in place in a simple manner. Ground surface 80, of cylinders 59, and 179, holds the two halves of the cylinder head closely in place, so that no pressure occurs to have a tendency to separate these two halves when an explosion takes place within the combustion chamber.

To fit the rings, I turn and grind the rings to a diameter slightly smaller than outer diameter of piston tube 73, 150, and 151; and then slip the said rings onto said tube before the tube is assembled. The rings are then hammered, so that when new these rings have a slight gap that closes as the rings wear. The rings are properly spaced: the cylinder head is split: the piston tube assembly is set into the lower half, and the upper half is then set in place, thus enclosing the said rings.

The cylinder heads are cored for fluid cooling, and for heating the fuel in fuel channels 76. Arranged within this chamber are fuel barrels 77 that closely fit fuel plunger 74. Barrels 77 are bored for the bushing 78, having slots 79 milled in the lower outside diameter. Fuel plunger 74 has slots 79a milled in upper surface, the number of slots in both parts, depending on the size of engine. Said slots are located as described so that when plunger 74 is home against ground beveled surface 81 of bushing 78, Fig. 8, the said surface 81 cuts the flow of fuel, thereby sealing the fuel from the combustion spaces. When open, the fuel enters just as the engine reaches dead center.

By these milling operations I eliminate the usual watch work, commonly used in drilling small holes in the fuel mechanism, and thus I provide for extremely accurate outlets.

Fuel channel 76 is supplied with fuel through drilled holes 87, and nipples 88, extending downwardly through lugs 61, and through lower casing lugs 55. The gasket is held tight against the pad 90 by a nut 91 screwed on the end of nipple 88, thus preventing the cooling fluid from mixing with the fuel.

The term fuel is broadly used, because with my new and novel construction, any fuel, such as crude oil from the well, preferably, Diesel oil, gasoline, gas, or alcohol can be used. This feature is important, for in the development of my engine for use in automobiles, aeroplanes, dirigibles, stationary and marine engines, trucks, busses, tractors, and locomotives; it may be necessary to use these various fuels.

A serious fault of the old two and four cycle engines is that the explosive charge is compressed and fired in the same cylinder. The flash points of different fuels vary, so that premature explosions often called detonations have been a common cause of crank shaft failures, because these premature explosions severely stress the crank shafts as they occur, and in time often cause failures.

Diesel engines admit the fuel ten or more degrees before dead center to preheat the fuel, by having it intermingle with the hot air that is rapidly getting hotter under compression, and the fuel, if low flash, ignites before dead center. This eliminates the use of many crude oils, and has meant that Diesel oil is better. By Diesel oil is meant crude oil after the low flash derivatives have been removed by refining. Diesel oil was developed after numerous crank shaft failures.

My invention overcomes this failing; for I provide an air compartment where the air, or oxygen is highly compressed and heated, and is then forced into a combustion chamber, where the hot oil is admitted just after the admission of the hot air; all of which occurs during the last part of the stroke before dead center. Therefore I positively fix the firing point, regardless of the fuel used. By using the fuel as the cooling fluid for the engine and compressor I preheat the fuel for combustion.

At the spring 84 end of barrel 77 is a fuel hole 93, which admits fuel to fuel barrel, so when the plunger 74 is depressed by the action of the exhaust valve at the end of the stroke, hole 93 has admitted fuel from the fuel channel 76, so as said channel is never completely filled with fuel. The said plunger has displaced the fuel back into the fuel channel which is only filled to a level with the upper inside wall 94 of fuel channel 76, as shown in Figure 10. Thus only a minimum of resistance is encountered by the plungers in their operations.

Piston tube 73 is provided at one or both ends with threads which are screwed into threaded portion 132 of piston sections 133, as shown more clearly on Figures 3, 3a, 8, and 11. Piston sections 133 have ground surfaces 134 provided as a journal 136 for exhaust valve barrel 135.

The complete piston 137 is composed of two sections 133 joined at the center by ground joint 138, and being held together by fluid circulating tubes 139 and separator bolt tubes 140. All of said tubes being expanded in place with all ends flared, thus providing six connections for holding the complete piston 137 together.

The fluid tubes 139 connect the fluid compartments of the piston sections, so that the pistons are cooled, and while cooling said pistons, this fluid also cools the exhaust valves 87a. The separator bolt tubes 140 maintain a tight joint, so that fluid cannot escape into combustion compartment, and provide for the installation of shouldered separator bolts 141 whose function is to keep the two exhaust valves 87a an equal distance apart, so that when the valves are open on one side of the pistons those on the opposite sides of the pistons are closed. To insure a tight joint, pressure rings 136a are installed in ring grooves machined in ring grooves machined in ground surface 136. Said rings fit against the inside surface 136 of the inner surface of the exhaust valve barrel.

Whole pistons 137 have a number of piston ring grooves machined in the outer surface for conventional piston rings. Projecting from piston faces 143 are valve lugs 144. Cored in piston faces 142 are a number of exhaust ports 144a leading into a central exhaust port 145, which in turn leads into a central exhaust tube 146, common to all combustion cylinders. Tubes 146 are expanded into exhaust barrels 148, and flared over the curved end 147, and as said tubes are provided with shoulders it is obvious that a portion of the engine load will be cared for by the metal of the said tubes, and thus the tubes serve a double purpose.

Complete piston tubes are assembled as follows—central exhaust end tube 146 has its ends shouldered and expanded into exhaust barrels 148, Figures 3, 3a, and 11, and its end flared over 147. Piston tube 111 then has an exhaust valve 87a put on, Fig. 13, and is then screwed into threads 132, said piston tube having been machined but not ground. Another piston section 133 is then assembled likewise. Intermediate piston tube 150 is then screwed in place, then two exhaust valves 87a placed onto said intermediate piston tube, and then these tubes are joined by expanding the fluid and bolt tubes as before described.

Piston section 152 is made similar to 133, with this difference; the opening at center is closed over as shown in Figures 3 and 3a. Opposite the compressor dead air space tube 153 is a beveled ground joint 154, so that when tube 155 is screwed into threads 132 the dead air space tube 153 fits into ground joint 154.

The compressor tube from where it is screwed into 132, to the end of the complete piston tube, is shown as being cast integral, and is the complete compressor piston tube, as shown in Figures 3, 3a, 4, 5, and 6, so that when joined to section 152 as before described, the complete piston tube has been assembled. This completed piston is then swung between centers, and the outer surface of piston tubes 111, 73, compressor piston tube 150, and compressor intake tube 157, are ground, thus providing a straight piston. The outer surfaces of all pistons are ground and contact lugs 86a on exhaust valves are trued by grinding, insuring perfect contact on all lugs.

Piston sections 133 are finished complete except the outer surfaces. The exhaust valves are finished and ground, and the beveled surface is lapped into a beveled surface on the piston sections before the assembled portions are joined together. To provide for expanding the fluid and bolt tubes in said piston sections, I provide openings opposite each tube for the expanding tool. The openings are shown as being threaded, Figures 3 and 11, for any suitable plug.

Heretofore it has been the common practice to make the cylinder walls of all engines, not air cooled, of solid metal; and this practice in large engines has proven faulty, because, when this wall thickness becomes too great, internal stresses are set up within the metal causing failures of the large cylinders. Furthermore, these solid walls cannot be properly cooled. To overcome these objections I provide a reinforced cooling fin wall having all excess metal eliminated, so that large engines can be provided with cylinders of any size, properly cooled without internal strains.

My cylinder walls are more uniformly heated, because I fire at both sides of each engine piston, and compress on both sides of the compressor cylinders.

Near each end of cylinders 59 and compressor cylinder 179 are annular air storage compartments 162 provided with combustion chamber intake, and compressor outlet, openings 163a, compressor operation described later, for charging the highly heated air, evenly around the entire circumference of the combustion cylinders, so that said air mixes in a turbulent manner with the fuel, after the intake valve 163 opens, by coming in contact with valve lugs 144 and face of the valve 164. Said valve having been lapped into end bevel 166, and ground surface 80 forms a large, tight valve.

Fuel on being admitted through slots 79 of bushing 78 as before described, is completely broken up into a fine mist of hot, crude oil, very close to, or above its flash point, so that as soon as this mist obtains the required air, or oxygen, combustion occurs.

When the starting motor-generator 101 revolves the crank shaft 102, to either dead center, spring 84 has been compressed, and the proper amount of fuel has been measured into the fuel valve body 167, Fig. 8, spring 84 forces the fuel through slots 79 of bushing 78, thus forcing the fuel in, just after dead center, the proper time for firing.

Spark, or glow plugs 68, are illustrated; and may be used in combination with the heated fuel, and hot air, if desired.

As the piston nears the end of each stroke, contact lugs 86a contact stem 85, thereby closing the exhaust valve, and then the piston moves on to dead center; and just before dead center, intake valve lugs 144 contact intake valve 163, thus charging the combustion space. Dead center being reached with the exhaust valve on the firing side held closed, and the intake valve wide open. After passing dead center, the intake valve 50 cylinders 59, and 179, Figs. 3a, and 8, are closed, and held closed by valve plungers 170 actuated by springs 171; and then in closing fuel is forced into the hot air by spring 84, pushing against plunger 74, and combustion occurs. This force acts against wall 174 of exhaust valves 87a and keeps the exhaust valves on the firing sides tightly closed until near the end of the stroke, when the said exhaust valve has had the extremely high pressure expanded to a low pressure; and then, as contact lugs 86a, on the opposite exhaust valves contact stem 85, the combustion side of compound cylinder is opened, and the exhaust valve on the fresh side is closed.

When the exhaust valve is closed on one side of my compound cylinder, the other exhaust valve is wide open, and is held open during nearly the complete stroke by the firing charge on the opposite side. The exhaust gas is forced into ports 145, leading into tube 146, and then to atmosphere through exhaust pipe 206. Thus I produce a new, and novel way of scavenging a tandem two cycle, compound cylinder.

To start my engine clockwise, I set the reversing lever 96 in position shown on Figure 13 so that bevel pinion 97 is in mesh with bevel teeth 98 on flywheel 95. Said pinion 97 is fastened to tube 99, splined to a combination starting, and generating motor shaft 100. Said motor is of any suitable make.

Flywheel 95 is fastened to crank shaft 102, journaled in bearings 103, shown as babbitt, but may be ball, or rollers; so that when I operate any conventional switch connected to the usual battery, electric current flows to motor 101 which starts motor shaft 100 revolving. Small pinion 97 drives the flywheel clockwise, and this revolves crankshaft 102 on which a split forked connecting rod 104 fastened together by bolts 122 is journaled in bearing 105. Full forward position is shown in Figure 13. Gear 220 is provided for driving governor.

Connecting rod 104 is journaled at the other end to pintles 105a, rocking in split bearings 106, Figure 13. Pintles 105a are machined on connecting rod end of tube 107. Said tube has threads cut therein for gland 108 which retains packing 109 in its proper place, thus sealing the cooling fluid in the channel. Said cooling fluid cools exhaust tube 110 and piston tube 111. Gland 112 retains packing 113 in end of exhaust outlet 114, thus sealing the cooling fluid from entering exhaust tube 110.

Plug 119 is provided for tightening up packing 113 as wear occurs.

At each end of stroke the action of the pistons operate my automatic valve mechanism, so that as far as the valves are concerned, the direction of rotation does not matter. Therefore, to reverse my engine, it is only necessary to stop it by closing the oil to combustion cylinders, and then move reversing lever 96 to the left, which moves pinion 97, out of mesh, and pinion 210, into mesh with the other side of flywheel teeth 98, thereby changing to contra-clockwise rotation.

Around intake valves are equalizing spaces 172, surrounding the inside surfaces of said valves, so that the combustion, and compression pressure is equalized, and in this way springs 171 common to all cylinders, hold the valves tightly closed under pressure.

My new and novel valve construction permits much higher speed of rotation, and piston travel. This means much more power output, and smaller units for crude oil engines.

My direct driven compressor is practically another cylinder in line, with this difference however; the intake air is sucked into both sides of my compound cylinder through the center tube because the center tube has been blocked off as before described, so that, instead of being an exhaust tube, the right hand end of tube 157a, Figures 3, 3a and 4, becomes the air intake tube. Valves 163 in the compressor become outlet valves.

The operation of the compressor is as follows:—The engine impulses drive compressor casting 175 toward either dead center. During nearly the complete length of stroke, fresh air is sucked into the cylinder through intake tube 157a. Just before dead center, contact lug 180, projecting from outer ring 176 comes in contact with outlet valves 163, and opens said valves; and the compressed air is forced into storage space 162, similar to all combustion cylinders.

The outer ring 176 is provided with beveled surfaces 177, ground and lapped to fit beveled surfaces 178 on casting 175 having ring grooves in outer face for the ordinary piston rings. When air cylinder space 179a is full of fresh air and the stroke begins, the piston rings being expanded, grip the inner cylinder piston wall. The weight of the outer ring also tends to retard the ring 176, so that with any remaining compressed air under pressure, the said ring is in contact with ground surface 178 until this pressure has dropped to normal; and then the ring and piston rings retard the said ring until the beveled surface 178 comes in contact with beveled surface 177, thus closing the intake valve on one side, and opening the other side of the compound cylinder for the admission of a fresh charge. As long as there is any pressure remaining after the discharge, this compressed air is pushing against the compressor piston, thus helping the engine function.

Air enters the compressor cylinder through tube 157a, then through intake ports 173a, Figs. 3, and 3a, into the cylinder side that is open for charging. Piston casting 175 is cooled by having the cooling fluid pass through channel 127, and then through fluid ports 127a to the pump.

After the pressure hase been expanded to normal in the compressor cylinder, the piston rings 180a which fit into grooves 181a machined in outer surface of ring 176, Figures 3, and 3a, in their gripping action, retard ring 176 until beveled surface 178 contacts beveled surface 177 of ring 176; and this closes the cylinder on the compressing side, and the other side of cylinder is receiving a fresh charge of air. Ring 176, floating from side to side, automatically supplies the air for compression from a common intake tube 157. When air discharge valves 163, are forced open, the air is forced into storage space 162 of the air cylinders. The piston clearance is made small, so that practically all compressed air is discharged.

Attention is directed to the construction of the engine and compressor parts, and to the way in which they function. The cylinders are of the same general construction, but their functions are reversed. The compressor cylinder furnishes the proper amount of air for all cylinders simultaneously, and in some cases this cylinder will be made large enough to supercharge the said combustion cylinders, because it is my intention to provide small combustion cylinders into which a large volume of air is forced, so that a larger quantity of fuel can be exploded within this small space.

The power of an internal combustion engine is determined by the air or oxygen required for exploding or burning the fuel. It is a simple matter to admit more fuel. Supercharging heretofore has meant only a slight amount of excess air. I use the term as meaning that many times the cubic volume of the combustion cylinder, may be forced into the combustion cylinders.

The reinforcing and cooling fins are omitted on the compressor cylinder to show alternate construction. The shell 181 is also omitted for the same reason.

To provide for cast steel combustion or compressor cylinders, and for simple replacement; I show a thin cylindrical shell 181 that is closely machined and then pushed into the cylinders, so that in case of wear this thin shell can be readily replaced with one having a slightly thicker shell, and the pistons are then ground, to fit the new shell. Instead of removing a part of the strength of the cylinders, I replace with cylinders slightly stronger.

The cylinders are retained at the center by having rib 61 fitting into retaining grooves 183, machined in lower casing 151, and upper casing 52. Through the top of rib 182 is pin hole 184, that retains a liner 181 in the center of cylinder 59. Retaining the shell 181 and cylinder 59 in the center permits the shell and cylinder to expand both ways from the center, as expansion under heat occurs, thus eliminating any troublesome internal stresses that occur in most of the present internal combustion engines. This method of providing for expansion is new and novel. Ample clearance is provided at the ends of the said cylinders, and these joints are held tight by being ground joints. As expansion occurs, the valves 163 and 163a are pushed farther apart, only compressing their compression springs slightly more. Equalizing space is ample between the ends 186 of cylinder 59, and lugs 55, 56, 57, and 58; so that ground surface 80 is free to slide on ground surface 71 of cylinder heads 62 while maintaining a tight joint.

Air piston tube 150, and 157, is ground for nearly its entire length to provide a smooth surface for piston rings, and to maintain a tight joint at the end 187 of air cylinder head 188. Said end is threaded for a packing gland 189, so that packing 190 can be tightened to exclude the cooling fluid from the compressor cylinder.

End 191 of piston tube 157 is threaded for a pump ring 192, Figure 4. Said pump ring has a beveled surface 193 facing and registering with a beveled surface 194 of the pump piston ring 195, which is split at 196, similar to common piston rings. Said rings are made slightly larger than the inside diameter of barrel 197, and are then split and lapped into the barrel. Ring 195 is loosely held lengthwise in barrel 197 by dowels 198 secured to tube 157, to allow for the passage of the cooling fluid through channel 199.

My pump is new and novel in construction and is built into the engine in such way, that a slight leak will cause no trouble. Having the same length of stroke as the engine, practically, means that ample cooling fluid is passed through the engine and compressor to adequately cool the same.

The action of my pump is as follows:—As tube 157 starts on its stroke, Figure 4, ring 195 being expanded against the inside diameter of barrel 197, stays in its position as shown, until beveled surface 193 of pump ring 192 comes in contact with beveled surface 194 of pump ring 195, which closes the pump opening; and the cooling fluid ahead of these rings is moved in channel 199 to the outer surfaces of the piston heads, around the cylinders, and then sucks or displaces the cooling fluid in the pistons; and circulates all of the cooling fluid through my invention, including cooling the valves.

This fluid, entering through 202, Figs. 2, 3, 3a, and 4, in cooling the engine, and compressor, becomes heated, and when the fluid is crude oil, the preferred fuel, this heated oil then is piped from 201, through pipe 253, to the fuel mechanisms, and is admitted to the combustion chambers as preheated fuel.

It is recognized that heat is horse power. Therefore, all heat, that can be recovered means that more horse power will be developed. Instead of wasting the heat incurred in combustion, I utilize this heat to highly preheat the fuel. As is well understood, it is possible to highly heat gasoline or any of the higher grades of derivatives of crude oil when air is excluded. Pressure will be generated which is used to overcome the high pressures of the air so that when the hot air mixes in a turbulent manner with the hot gaseous fuel, no trouble is experienced in firing the charge.

Another important improvement of my invention is; that all valves open by a square push that does not rock the said valves, in any manner thereby eliminating any egg-shaped wear.

An engine's size, its operating speed, and its working pressure are the three factors that effect power output. My new automatic valves permit high speed in crude oil engines by properly scavenging, and receiving a fresh charge. My engine can be made as large as desired, because of the super-charging and construction of my cylinders; the super-charging means vastly increased pressures.

It is obvious that I can use both ends of my engine to drive crank shafts, as illustrated on Fig. 13, furthermore the valve construction provides for driving clockwise, or contra-clockwise, and also for driving one end clockwise while driving the other end contra-clockwise if desired; this feature is vitally important when the engine is used for driving aeroplanes or boats having two propellers, one at each end, synchronized, providing for keeping these craft on an even course; to start my double-ended engine, two starting-generator motors are used and one starting lever 96, is as shown on Fig. 13, the other end having gear 210, in mesh with the teeth 98 of flywheel 95, with the lever pulled out. It is obvious that these can be operated by starting-motor-generators having their direction of rotation changed, one end clockwise and the motor at the other end contra-clockwise.

The hot compressed air leaves compressor cylinder from spaces 162 through pipe 203, threaded into T 204, and then through pipe 205, to governor valve 221 controlled by governor 218, thence through pipe 222, to T 223, to pipe 224, to one end of combustion cylinder space 162, a part of the hot air travels through T 226, pipe 227 to other end of first combustion cylinder, and then through valve 228, to T 229, to pipe 230, to the front annular space 162 of second cylinder 59, and then through similar piping to opposite end of second cylinder, then through valve 231, and more piping to the third combustion cylinder.

When it is desired to operate on one, or two cylinders, pulling a partial load, the valve 228, or 231 is closed.

Similar fuel valves can be provided in fuel supply pipe 253 to control the fuel.

Having thus described my invention, what I claim, as new therein, and desire to secure by Letters-Patent of the United States, therefore, is—

1. In an internal combustion engine exhaust valves mounted on bearings and connected together through the piston and forming the major portion of the piston heads of a two cycle, compound, internal combustion engine, a piston arranged so that the power of the explosion holds one valve closed and the opposite valve wide open for nearly the full length of the stroke thereby providing for scavenging both sides of the said compound cylinder, substantially as described.

2. A multiple cylinder, two cycle, compound, internal combustion engine and compressor having all engine and compressor cylinders on the same center line arranged so that the burned gas from the compound engine cylinders is forced through a common fluid cooled exhaust tube extending through the center of the cylinders, and the compound compressor cylinder or cylinders having the air for compression drawn into both sides of the compound piston, or pistons through a common fluid cooled intake tube substantially as described.

3. In an internal combustion engine a compound compressor automatic intake valve which forms the outer periphery of the piston in the form of a ring so that when one side of the compound cylinder is compressing the opposite side is sucking in a fresh charge through the port extending completely around the outer edge of the piston, said valves having piston rings, located in the outside face of said valve that maintain a tight joint with the cylinder surface and also act as the holding means for the opening of the valves after compressing and discharging on one side, said valves being provided with projections on each side so that at the discharge end of the stroke the said projections contact with and open the balanced compressor ring discharge valves which discharge into reservoirs at each end and formed into the walls of the compressor cylinder, substantially as described.

4. A compound piston having the heads loosely mounted on journals secured to a circulating fluid circular compartment, the said heads being in the form of valves held together so that when one of the said valves is closed and held closed by the explosion the opposite valve is held open during the greater part of the stroke of the engine, the said valves being cooled by the said fluid, substantially as described.

5. In combination with a two cycle, compound, internal combustion engine and compressor, a compressor piston having the outer diameter in the form of a ring and having piston rings mounted in slots in the periphery and being provided with contact lugs extending from both sides of said valve for engagement with ring discharge valves located in the ends of said compound compressor cylinder so that when said lugs reach nearly the extreme end of the stroke they come in contact with and actuate the opening of the said compound compressor discharge valve and during the compression on the side just described, said piston being also provided with hollow spaces connected by channels so that the cooling fluid from the annular space between the intake and piston tubes circulates through and cools the compressor piston and intake valve.

6. A two cycle, compound internal combustion engine and compound compressor having a fluid cooled pipe extending through the center of these tandem cylinders arranged to scavenge both sides of a series of engine cylinders from one end of said pipe, and also arranged to supply a fresh charge to a compound compressor cylinder, or cylinders from the other end of said pipe through double acting valves, reciprocating with engine and compressor pistons, said valves forming parts of pistons, movable in said pistons and reciprocating therewith.

7. A tandem compound engine and compound compressor having double acting, automatic valves forming parts of pistons of said engine, and compressor, said valves movable in said pistons, and reciprocating therewith.

8. In an internal combustion engine, tandem compound cylinders having annular compartments completely surrounding ends of said cylinders in combination with automatic valves located in each end, one end for the exhaust and the other end for the intake.

9. In an internal combustion engine, tandem compound cylinders in combination with reciprocating pistons having outer faces on said pistons, automatic exhaust valves operated by the movement of said pistons, and pressure means for exhausting said cylinders, said exhaust valves forming the major portions of the faces of pistons reciprocating in said cylinders.

10. In a tandem, multiple, two cycle, compound, internal combustion engine, a compound compressor having cylinders in line on the same center with a fluid cooled exhaust, an intake tube extending into and through the center of said tandem cylinders, said tube being surrounded by a cooling fluid channel for cooling the exhaust tube, an intake tube, double acting pistons, double acting, automatic, exhaust, and intake valves, said cylinders having annular compartments integral therewith, surrounding the ends of said cylinders having free annular opening completely around the periphery at each end for the accommodation of the intake, and exhaust valves.

11. A two cycle, compound internal combustion engine having the exhaust pass through an open cooled exhaust valve, into a fluid cooled valve casing and hollow shell piston, thence through a circulating fluid cooled shell exhaust tube extending lengthwise through the center of the cylinder thus providing a muffled engine, said exhaust valve being double acting, operated by the stroke of said engine and being held open on the exhaust side and closed on the firing side by the power of the explosion of said engine, said exhaust valve being cooled by being in contact with a cooled valve casing and cooled exhaust tube, said circulating fluid being forced through the engine by a pump consisting of a beveled ring secured to the end of piston tube that contacts the beveled surface of a beveled piston ring mounted in pump casing when the said piston tube moves toward the cylinder, said piston tube being connected to the said piston having the smaller exhaust tube also connected to the piston forming an annular fluid passage which conducts the fluid through the piston and thence into a like annular fluid channel on the other side of piston thereby cooling the exhaust tube, piston tube, cylinder head journals, piston, exhaust valve, and other cylinder head journal, said muffling effect being produced by the exhaust gas expanding in the center of the cylinder and having a fluid cooled channel and a fluid cooled piston surrounding the said exhaust, and further the noise being muffled more by fluid which cools the engine cylinder.

12. A multiple cylinder, two cycle, compound, internal combustion engine, and compound compressor, comprising pistons in the form of two exhaust valves, movable in said pistons, and reciprocating therewith in cylinders, arranged with one cylinder ahead of the next, on the same center line; projections on the faces of said pistons, in combination with ring intake valves that are opened with a square push by direct contact with said projections, thereby providing turbulent mixing of air and fuel.

13. A two cycle, compound, tandem, internal combustion engine, and compound compressor, provided with spring actuated fuel valve stems that contact and close double acting engine exhaust valves forming the major portions of the faces of pistons, movable in said pistons, and reciprocating therewith on one side of said pistons, while opening engine exhaust valves on the opposite side of said pistons, opening the engine ring intake, and compressor discharge valves by contacting projecting lugs on outer edges of pistons, opening fuel valves, after closing said engine exhaust valves, thereby providing a complete set of automatic valves actuated by pistons at the end of the stroke, for either clockwise, or contra-clockwise rotation of a single throw crank shaft, substantially as described.

14. A tandem, two cycle, double ended, compound, crude oil, internal combustion engine, in combination with a set of automatic valves consisting of a cooled cylinder, fastened at the center by lugs fitting into the engine casing, free to expand both ways from the center, having annular air compartments adjacent each end, and ports surrounding a beveled enlarged end into which a ring intake valve reciprocates, having contact ring extending inwardly for contacting projecting lugs on the faces of piston; said pistons composed of two central shells fastened together at ground joint by fluid cooling tubes, and exhaust valve separator bolt casings; exhaust valves forming the major portions of faces of the piston, being separated by shouldered bolts that keep the valve on the exhausting side wide open while the explosion on the firing side keeps the mated exhaust valve on opposite side of said piston closed; said closing being done by the valve on exhausting side coming in contact with spring actuated fuel valve stem, and a plunger, having milled slots in its outer periphery for admission of fuel to a measuring chamber, said fuel being delivered into a combustion chamber by valve springs located in a cooled barrel in a split, double acting cylinder head, anchored in outer casings by retaining lugs located in the central outer periphery of said head, thereby providing for expansion both ways from the center as heat occurs in the cooled cylinder head; said valve stems reciprocating in bushings having milled slots in the outer periphery of said bushing for admitting fuel to combustion chamber; said bushings being pushed into said cylinder heads; exhaust valves discharging into an exhaust port located in the central part of piston shell, being discharged through a central cooled exhaust pipe connecting to all pistons and then to atmosphere through a vertical pipe at one end of engine; said exhaust tube being cooled by an annular space surrounding said pipe by having the cooling fluid flow between the outer surface of exhaust pipe and inner surface of larger piston tube connecting all piston shells, substantially as described.

15. A compressor, in combination with a set of automatic valves, consisting of a cooled cylinder, fastened at center by lugs fitting into an annular groove in outer casing, free to expand both ways from center, having annular air compartments adjacent each end of said cylinder, said ends having ports in the beveled face of enlarged ends, into which ring exhaust valves reciprocate, said valves having contact rings extending inwardly, for contacting projecting lugs, on faces of the inner beveled outer ring, made wider than outer beveled edges of piston shell, containing piston rings fitted into the periphery of said outer ring, being in contact with inner surface of said compound cylinder, free to float from one beveled inner edge of ring, to the beveled outer edge of the piston shell, when projecting lugs on outer faces of outer ring contacting cooled spring actuated, balanced ring exhaust valves; cylinders charged by cooled intake tube valves, extending from the center of piston shell, through the center of said cylinder to outside atmosphere, or source of supply; said intake tube being cooled by fluid in an annular space formed by outside surface of the intake tube, and inside surface of the piston tube, both tubes cast integral with the piston shell, formed with intake ports in center of said shell discharging evenly around the periphery of said shell and supplying the cylinder through an annular space between the outer surface of said shell and inner surface of the outer ring, cooling fluid being forced through a fluid barrel to the outside surface of said cylinder by a pump, consisting of a beveled ring secured to end of said piston tube which contacts a beveled piston ring fitting against the inner surface of said fluid barrel, reciprocating with the said piston tube, thereby displacing all of the cooling fluid; thus cooling the cylinder head, intake, and piston tubes, intake, and discharge valves, and the piston, substantially as described.

CHARLES B. YODER.